Patented Jan. 25, 1938

2,106,180

UNITED STATES PATENT OFFICE 2,106,180

PROCESS OF PREPARING TERTIARY ETHYNYL CARBINOLS AND PRODUCT THEREBY PRODUCED

Oscar Robert Kreimeier, Woodstown, N. J., assignor to E. I. du Pont de Nemours & Company, Wilmington, Del., a corporation of Delaware No Drawing. Application July 20, 1936, Serial No. 91,622

7 Claims. (Cl. 260—156)

This invention relates to unsaturated tertiary carbinols, and to processes for making the same. More particularly it relates to an improved process of making tertiary ethynylcarbinols.

Tertiary ethynylcarbinols have been prepared heretofore by reacting alkali metal acetylides with the desired ketone and isolating the carbinol by suitable means. The alkali metal acetylides used in such preparations have been made (1) by reacting the alkali metal with acetylene in a suitable reaction medium such as liquid ammonia, ether or benzene, or (2) by reacting acetylene with an alkali metal amide in liquid ammonia, dry ether or other suitable reaction medium. The first method has not been practiced to any great extent because of undesirable side reactions such as polymerization or hydrogenation of some of the reactants, whereby yields are reduced and the product contaminated. The second method, i. e., the use of alkali metal amides, has heretofore been open to three objections: alkali metal amides are inconvenient and expensive to prepare and store; they have not been sufficiently soluble in reaction media such as liquid ammonia; and the particular types of alkali metal amides used heretofore react very slowly and the yields of alkali metal acetylides have consequently not been good.

This invention has as an object the provision of a new process for making tertiary ethynylcarbinols. Further objects are new tertiary ethynylcarbinols not hitherto prepared. Other objects will appear hereinafter.

These objects are accomplished by the following invention which consists in reacting an alkali metal with an excess of liquid ammonia in the presence of an alkali metal oxide and of an ammonia-soluble hydrated salt of a ferrous metal, reacting the solution of alkali metal amide thus formed in situ with acetylene, and finally reacting the resulting alkali metal acetylide with a ketone. All three steps are carried out in liquid ammonia solution as one continuous process. Sodium is a typical alkali metal, sodium oxide a suitable alkali metal oxide, ferric nitrate enneahydrate a typical hydrated ferrous metal oxide, and acetone and other dialkyl ketones the preferred ketones.

The present invention rests upon my discovery that tertiary ethynylcarbinols can be obtained in excellent yields and in a high state of purity by reacting ketones with an especially reactive and soluble form of alkali metal acetylide which is in solution in the liquid ammonia in which it has been formed and which is in turn prepared from a very reactive and soluble form of alkali metal amide, e. g., sodamide. The preparation of this particularly reactive and soluble sodamide, which forms the first step of the present invention, is described by Vaughn, Vogt and Nieuwland (J. A. C. S., 56, 2120–2122 (1934)), and consists essentially in reacting sodium with excess liquid ammonia in the presence of catalytic proportions of sodium oxides and of ammonia-soluble, hydrated iron, cobalt, or nickel salts (herein termed ferrous metal salts). The second step of the invention, also mentioned by Vaughn, Vogt and Nieuwland, is to react the sodamide in situ (i. e., without isolating it from the liquid ammonia in which it is formed) with acetylene to form sodium acetylide of a variety which is particularly reactive. The third and final step of the invention, which is also new in itself, is to react the sodium acetylide in situ (i. e., without isolating it from the liquid ammonia in which it is formed) with the selected ketone. In this last step, reaction is rapid and after about fifteen minutes is usually essentially complete. The ammonia is then evaporated off; the residue is treated with water; and the resulting solution or suspension is acidified to liberate the free tertiary ethynylcarbinol.

The sodium acetylide and the sodamide used in the process of the present invention are more reactive and more soluble in liquid ammonia when they are not isolated from the reaction mixtures in which they are prepared. To this fact is attributed in part the superiority of the process over processes disclosed in the art. It is to be emphasized that the highly soluble and reactive sodium acetylide described herein cannot be obtained by reacting acetylene with sodamide of the commercial variety, i. e., with sodamide which has been isolated from the reaction mixtures in which it was formed. Ordinary sodium acetylide is not satisfactory for the purposes of this invention since it is neither sufficiently soluble in liquid ammonia nor sufficiently reactive with ketones to produce the high yields which are characteristic of the present process.

Having thus outlined the principles of the invention the following exemplifications thereof are added in illustration but not in limitation. Unless otherwise stated, parts given are parts by weight.

EXAMPLE I.—DIMETHYLETHYNYLCARBINOL

*A. Preparation of sodamide*

One (1) part of sodium was added to a mechanically stirred mixture of 0.3 part of finely powdered ferric nitrate enneahydrate

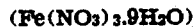
(Fe(NO₃)₃.9H₂O)

in 385 parts of liquid ammonia, contained in a reaction vessel of about four times the volume of the ammonia. Air was bubbled through the solution until the blue color was discharged in order to form oxides of sodium in the reaction mixture. Forty-six (46) parts (2 mols) of sodium were then added in small pieces. The reaction set in at once and in ten to twenty minutes the blue color had changed to gray, indicating the end of the conversion. Any suspended catalyst may be removed by filtration.

B. Preparation of sodium acetylide

Acetylene gas was passed into the liquid ammonia solution of the sodamide prepared as described above until the color of the solution changed from gray to black, the temperature of the reaction mixture being maintained at —40° to —50° C. This change in color indicates the completion of the reaction between the acetylene and sodamide.

C. Preparation of the carbinol

One hundred sixteen (116) parts (2 mols) of dry acetone were added to the liquid ammonia solution of sodium acetylide prepared as described under B above, the temperature of the reaction mixture being maintained at —50° to —40° C. After fifteen minutes, reaction was complete. The ammonia was evaporated; the residue was dissolved in water; and enough acetic acid was added to give an acid reaction to litmus paper. The aqueous solution was then steam distilled until no more dimethylethynylcarbinol distilled, as indicated by saturating a small sample of distillate from time to time with anhydrous potassium carbonate and observing whether an insoluble layer separated. The distillate was then saturated with anhydrous potassium carbonate in order to "salt out" the dimethylethynylcarbinol, which was separated, dried with anhydrous potassium carbonate, and distilled. One hundred thirty-six (136) parts of dimethylethynylcarbinol was obtained, this amounting to an 81% yield based on the sodium. This compound has the following properties: B. P. 30°–35° C./25 mm.; N²⁰_D 1.4198.

EXAMPLE II.—METHYLETHYLETHYNYLCARBINOL

Example I—C was repeated using 140 parts of methyl ethyl ketone in place of the 116 parts of acetone. One hundred eighty-one (181) parts of methylethylethynylcarbinol was obtained, this being a 92% yield based on the sodium. This compound had the following properties: B. P. 118°–121° C./760 mm.; N²⁰_D 1.4300.

EXAMPLE III.—DI-ISOPROPYLETHYNYLCARBINOL

To a solution of sodium acetylide in liquid ammonia, prepared as described in Example I, parts A and B, were added 228 parts (2 mols) of di-isopropyl ketone. The ammonia was allowed to evaporate, and the residue was dissolved in water and acidified with sufficient acetic acid to give an acid reaction to litmus paper. The water-insoluble layer was separated, the water layer extracted with ether, and the ether extract combined with the main portion, which was then dried and distilled. One hundred ninety-nine (199) parts of di-isopropylethynylcarbinol was obtained, representing a yield of 71%. This compound had the following properties: B. P. 164°–166° C./760 mm.; N²⁰_D 1.4472.

EXAMPLE IV.—METHYLAMYLETHYNYLCARBINOL

Following the conditions of Example I—C, 228 parts of methyl amyl ketone were reacted with 96 parts of ammoniacal sodium acetylide prepared as in Example I, parts A and B. Two hundred thirty-eight (238) parts of methylamylethynylcarbinol (65% yield based on the sodium) was obtained. This compound was a water-insoluble oily liquid boiling at 85°–86° C./25 mm.

EXAMPLE V.—ETHYNYLFENCHYL ALCOHOL

Following the directions of Example I—C, one mol. of freshly distilled fenchone (B. P. 84°–86° C./20 mm.) was reacted with one mol. of ammoniacal sodium acetylide prepared as in Example I, parts A and B. After evaporation of the ammonia, the residue was taken up in water and steam distilled. The oil in the distillate was dried and distilled. The main fraction, B. P. 99°–102° C./17 mm., consisted of ethynylfenchyl alcohol and amounted to 126 parts, a yield of 71% based on the sodium. This compound was found on analysis to contain 80.3% carbon and 10.2% hydrogen, the calculated values for a compound of the formula C₁₂H₁₈O being 80.9% and 10.1%, respectively.

EXAMPLE VI.—ETHYNYLCYCLOHEXANOL

One mol. of cyclohexanone was reacted as in Example I—C with one mol. of ammoniacal sodium acetylide prepared as in Example I, parts A and B. Eighty-eight (88) parts, or a yield of 73%, of ethynylcyclohexanol, B. P. 97°–103° C./65 mm., was obtained.

While the advantages of my process are particularly evident with low molecular weight aliphatic ketones having, for example, up to about six carbon atoms, it is possible, so far as is known, to use successfully any ketone or mixture of ketones. The ketone may be aliphatic, aromatic, alicyclic or heterocyclic; it may be saturated or unsaturated; it may have other functional groups such as carboxyl; and it may be a mono- or polyketone. Additional ketones which may be used in this invention include pinacoline (2,2-dimethyl-3-butanone), 2-methyl-cyclohexanone, methyl cyclohexyl ketone, benzoylacetone, suberone, methyl vinyl ketone, quinone, acetophenone, benzophenone, camphor, methyl isobutyl ketone, and levulinic acid. Where polyketones are used, polyhydric tertiary ethynylcarbinols are obtained. With certain ketone acids, the ethynylcarbinol which is formed may undergo cyclization to give a lactone.

In the first step of my invention, I prefer to use sodium and sodium oxide because of their availability and economy. However, they may be replaced wholly or in part by other alkali metals such as lithium, potassium, rubidium, and caesium, and their oxides. The oxide used as a catalyst may or may not be that of the metal reacted. Thus, sodium may be reacted with ammonia which contains potassium oxide therein, or potassium may be reacted with ammonia having sodium oxide therein. It has been found to be most convenient to use about 1 to 3%, based on the weight of the alkali metal, of the alkali metal oxide. The sodium or other alkali metal oxide is preferably formed in situ as in the examples, since the addition of sodium oxide to the ammonia usually introduces sodium hydroxide which adversely affects the desired reaction.

While ferric nitrate enneahydrate has been used to exemplify the second catalytic component, any ammonia-soluble hydrated salt of a ferrous metal, i. e., of iron, cobalt or nickel, may be employed. Thus, ferric chloride hexahydrate, ferric bromide hexahydrate, hydrated ferric acetate, hydrated ferric sulfate, ferric nitrate hexahydrate and hydrated nitrates, nitrites, cyanides, and thiocyanates generally of iron, cobalt and nickel may be employed. The hydrated ferric nitrates are preferred.

In the third step of the process, the ketone, before it is added to the liquid ammonia solution of sodium acetylide, may if desired first be dissolved in a suitable solvent such as dry ether, hydrocarbons, or liquid ammonia. This expedient, however, is not generally necessary or desirable. Any acid can be used to neutralize the reaction mixtures containing the tertiary ethynylcarbinol. In the examples acetic acid has been used as convenient and as illustrative of the process, but other acids such as formic, hydrochloric, sulfuric, nitric, or even carbon dioxide, may be used to neutralize the sodium hydroxide solution so that it is substantially neutral. As disclosed and claimed in Macallum Serial No. 91,619, filed of even date herewith, ammonium chloride may also be used to neutralize the reaction mixtures. In some cases it is convenient to isolate the ethynylcarbinols by extraction with a suitable solvent such as ether.

The invention is not limited to any particular proportions of reactants in any one of the three steps except that in the first step an excess of liquid ammonia must be used over that required to react with the alkali metal to form the alkali metal amide. This requirement is a necessary consequence of the use of liquid ammonia as a single, continuous solvent or reaction medium throughout all the steps of the process. As illustrated in the examples, reacting equivalents of sodium acetylide and ketones (i. e., 1:1 mol. ratios) are preferred in the third step in order to minimize the formation of by-products. The invention, however, is not limited to such proportions. For example, if a molecular excess of ketone over the sodium acetylide is employed, mixtures of products are obtained, viz., the ethynyl monocarbinols, together with more or less of ethynyl dicarbinols of the type

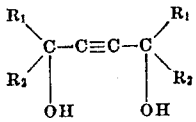

where $R_1$ and $R_2$ are, for example, monovalent hydrocarbon radicals. When two or more mols of ketone are used per mol. of sodium acetylide, as much as 50–70% of the product may be the dicarbinol.

The time required in the third step for reacting the ketone with the sodium acetylide will vary according to the ketone used and may range from a few minutes up to several hours. The reaction is ordinarily completed after one hour, but in many instances may be extended with advantage to five hours or more, higher yields being obtained thereby. This feature of the process is discussed in more detail in Macallum Serial No. 91,619, filed of even date herewith. The latter application also shows that, with these longer reaction periods, the sodium may tend to act as a catalyst for the formation of the tertiary ethynylcarbinol in the presence of excess ketone and acetylene. Yields of dimethylethynylcarbinol, for example, as high as 175% based upon the sodium have been obtained in this way.

The reaction between the alkali metal and ammonia can be carried out conveniently at the boiling point of ammonia at normal pressure, i. e., about −33° C. By the use of pressure, the reaction temperature may be raised even up to the critical temperature of ammonia, i. e., 132° C. Temperatures lower than −50° C. are not desirable, due to the decreased speed of reaction. The remaining steps in the process may be carried out similarly. Temperatures of about −50° C. to −30° C. and atmospheric pressure are preferred throughout the entire process. At lower temperatures, the solubility of the alkali metal acetylide in liquid ammonia is reduced, while at higher temperatures, the alkali metal acetylide has a greater tendency to polymerize the ketone.

Elevated pressures are advantageous when operating at temperatures above the atmospheric boiling point of ammonia inasmuch as they enable the ammonia to be kept in the liquid state.

The ethynylcarbinols prepared herein are useful for many purposes. They have been dehydrated to form substituted monovinylacetylenes and they have been hydrated to hydroxy ketones. Their esters with certain acids may be used as plasticizers for natural or synthetic resins, cellulose derivatives, etc. They are also useful as modifying agents for resins wherever alcohols are useful for this purpose.

The process of the present invention is highly advantageous in that it makes possible for the first time the preparation of a wide variety of tertiary ethynylcarbinols in better yields than have heretofore been possible, this being illustrated from the following experiment. Sodamide, prepared by passing dry gaseous ammonia over metallic sodium at about 300° C., was dissolved or suspended in liquid ammonia with stirring. Gaseous acetylene was passed into this mixture (cooled to about −40° C.) as described in Example I. Dry acetone was then added and the reaction mixture subsequently treated as in Example I. A yield of 48% of dimethylethynylcarbinol was obtained, as compared with a yield of 81% by my process.

Further advantages of my process over the prior art are that it avoids the difficulty, hazards and expense incidental to the isolation and storage of sodamide and sodium acetylide and to redissolving or dispersing these compounds in liquid ammonia or other reaction media when they are to be used for the preparation of tertiary ethynylcarbinols, since in the present process these compounds are prepared only when and as needed and are reacted at once in situ to form the ethynylcarbinol. Moreover, the low temperatures at which the reactions are carried out avoid polymerization of the reactants or of the products, thus promoting better yields and avoiding undesirable by-products. Owing to the fact that the reactants and products are all readily soluble in liquid ammonia, none of the difficulties which are incidental to the use of suspensions such as are necessary when the reactants are poorly soluble in the reaction medium are met with in this process, i. e., the reaction mixtures remain liquid, do not settle, are easy to handle, stir, pump, etc. An additional advantage arising out of the greater solubility of the reactants in liquid ammonia is that they are brought into more intimate contact with each other and therefore react more readily and completely.

My process is superior to the known use of alkali metal acetylides manufactured from the metal and acetylene in that the latter is open to the objection that one-third of the acetylene is lost by hydrogenation, as shown by the following equations:

(1) $2M + 2HC \equiv CH \rightarrow 2M.C \equiv CH + 2H$ (2) $HC \equiv CH + 2H \rightarrow H_2C = CH_2$ Combining (1) and (2)
$2M + 3HC \equiv CH \rightarrow 2M.C \equiv CH + H_2C = CH_2$ so that only 2 mols of alkali metal acetylide are obtained from 3 mols of acetylene. In the process of the present invention, hydrogenation losses are avoided, and the preparation and use of sodamide presents no difficulties.

In the specification and claims by "ammonia" is meant the compound $NH_3$ and not the solution thereof in water which is ammonium hydroxide. The term "alkyl" is used in the sense of a saturated aliphatic hydrocarbon radical. The term "ferrous metal" is used as a class name for iron, cobalt and nickel.

The above description and examples are intended to be illustrative only. Any modification of or variation therefrom which conforms to the spirit of the invention is intended to be included within the scope of the claims.

I claim:

1. Process of preparing dimethylethynylcarbinol which comprises reacting 46 parts of sodium with an excess of liquid ammonia in the presence of 1.5 parts of sodium oxide and in the presence of 0.3 part of ferric nitrate enneahydrate, passing acetylene gas into the ammonia solution of sodamide thus prepared at −50° C. to −40° C. until the gray color thereof changes to black, adding 116 parts of dry acetone to the sodium acetylide solution thus obtained, and isolating the dimethylethynylcarbinol by evaporating the ammonia, dissolving the residue in water, acidifying and steam distilling the aqueous acid solution, and salting out the product from the steam distillate.

2. Process of preparing dimethylethynylcarbinol which comprises reacting sodium with an excess of liquid ammonia in the presence of sodium oxide and in the presence of ferric nitrate enneahydrate, passing acetylene gas into the solution until the gray color thereof turns to black, adding acetone at about −40° C. and isolating the dimethylethynylcarbinol.

3. Process of preparing diisopropylethynylcarbinol which comprises reacting sodium with an excess of liquid ammonia in the presence of sodium oxide and in the presence of ferric nitrate enneahydrate, passing acetylene gas into the solution until the gray color thereof turns to black, adding diisopropylketone at about −40° C. and isolating the diisopropylethynylcarbinol.

4. Process of preparing dialkylethynylcarbinols which comprises reacting an alkali metal with an excess of liquid ammonia in the presence of an alkali metal oxide and in the presence of an ammonia-soluble hydrated salt of a ferrous metal, passing acetylene gas into the solution thus prepared, then adding at about −40° C. a dialkyl ketone and isolating the dialkylethynylcarbinol formed.

5. Process of preparing tertiary ethynylcarbinols which comprises reacting an alkali metal with an excess of liquid ammonia in the presence of an alkali metal oxide and in the presence of an ammonia-soluble hydrated salt of a ferrous metal, reacting acetylene with the alkali metal amide thus prepared, reacting the alkali acetylide thus prepared with a ketone and isolating the resulting tertiary ethynylcarbinol.

6. In the process of preparing tertiary ethynylcarbinols, the step which consists in reacting a ketone with an ammoniacal solution of an alkali metal acetylide of the formula $MC \equiv CH$, wherein M is an alkali metal, said solution being that in which the alkali metal acetylide is formed.

7. Diisopropylethynylcarbinol of the formula

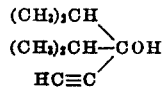

OSCAR ROBERT KREIMEIER.